United States Patent
Singh et al.

(10) Patent No.: US 8,838,710 B2
(45) Date of Patent: Sep. 16, 2014

(54) FORWARDING E-MAIL MESSAGE ATTACHMENTS FROM A WIRELESS DEVICE

(75) Inventors: Ravi Singh, Toronto (CA); Alexander Sherkin, Woodbridge (CA); Neil Patrick Adams, Kitchener (CA); Nikhil Vats, Vaughan (CA)

(73) Assignee: BlackBerry Limited, Waterloo, Ontario (CA)

( * ) Notice: Subject to any disclaimer, the term of this patent is extended or adjusted under 35 U.S.C. 154(b) by 427 days.

(21) Appl. No.: 13/228,604

(22) Filed: Sep. 9, 2011

(65) Prior Publication Data

US 2012/0110097 A1    May 3, 2012

Related U.S. Application Data (60) Provisional application No. 61/408,232, filed on Oct. 29, 2010.

(51) Int. Cl.
*G06F 15/16* (2006.01)
*H04L 12/58* (2006.01)
*H04L 12/18* (2006.01)

(52) U.S. Cl.
CPC .............. *H04L 51/08* (2013.01); *H04L 51/38* (2013.01); *H04L 51/14* (2013.01); *H04L 12/1859* (2013.01); *H04L 51/063* (2013.01)
USPC ......................................... 709/206; 709/203

(58) Field of Classification Search
USPC ................. 709/203, 217, 206, 224
See application file for complete search history.

(56) References Cited

U.S. PATENT DOCUMENTS

| 7,054,905 B1 | 5/2006 | Hanna et al. |
| 2002/0010748 A1 | 1/2002 | Kobayashi |
| 2005/0021938 A1 | 1/2005 | Kidokoro |
| 2009/0220084 A1* | 9/2009 | Brown et al. ............... 380/270 |

FOREIGN PATENT DOCUMENTS

EP           1420554           5/2004

OTHER PUBLICATIONS

EP search report from corresponding EP application 11180780.6 dated Feb. 14, 2012.

* cited by examiner

*Primary Examiner* — El Hadji Sall
(74) *Attorney, Agent, or Firm* — Gowling Lafleur Henderson LLP (57) ABSTRACT

A system and method of forwarding an e-mail from a wireless device is provided. The wireless device receives the e-mail message in portions as needed, the portions having the attachments contained therein. The portions of the e-mail message containing only a subset of attachments associated with the e-mail message in the user mailbox. When a wireless device forwards the e-mail message to one or more recipients a message identifier and an attachment indicator is provided for identifying the number of attachments in the e-mail message to be forwarded. The identified e-mail message is retrieved and the attachments are extracted from the retrieved e-mail message based on the attachment indicator. The e-mail message is forwarded to the one or more recipients and the extracted attachments.

23 Claims, 7 Drawing Sheets

FORWARDING E-MAIL MESSAGE ATTACHMENTS FROM A WIRELESS DEVICE

CROSS-REFERENCE TO RELATED APPLICATIONS

This application claims priority from U.S. Provisional Application No. 61/408,232 filed on Oct. 29, 2010 the contents of which is hereby incorporated by reference in it's entirety.

TECHNICAL FIELD

The present disclosure relates to the forwarding of electronic mail (e-mail) and in particular to forwarding of electronic e-mail containing attachments from a wireless device.

BACKGROUND

When a wireless device receives a regular, or unencrypted e-mail message from a mail server, typically the mail server scans the message and extracts all attachment headers and sends them to the device along with the first small chunk of the body of the message. This means that when the device receives the initial data for an e-mail message, even though the device may only have data for a small portion of the e-mail message, it immediately knows what attachments are available in the message, since the attachment headers (typically consisting of the attachment filenames and content types) are enough for the user to know what attachments are associated with the message.

In the case of encrypted messages, the mail server is unable to decrypt the contents of the message to scan for the attachment headers is it does not have appropriate decryption keys as only the sender and receiver are able to decrypt any messages.

A typical e-mail message format looks like:
Body
Attachment header 1
Attachment 1 data
Attachment header 2
Attachment 2 data Therefore, a device that has only received a portion, such as provided by mail servers of an encrypted e-mail message may only see the body of the e-mail message, or just the first attachment (but not necessarily the 2nd), or just the first two attachments, (but not the third), etc, depending on how much data the device has received for the message. This may be a particular problem for mail protocols designed to conserve resources of the wireless device, such as bandwidth and memory, by not downloading all of the message if not requested to do so by the user. For example, in the LEMONADE profile, Enhancements to Internet email to Support Diverse Service Environments, defined by the Internet Engineering Task Force (IETF) in RFC 2550, e-mails may be forwarded without being downloaded to the mobile device to conserve bandwidth and device resources. If attachment #1 is very large, for example 5 Megabytes (MB), then the device would have to download all 5 MB of attachment #1 before it could see the attachment #2, which may be unreasonable to do for the device in many cases. The attachments may not be downloaded or viewed by the user unless the entire message is received by the wireless device. Unknowingly forwarding attachments can be a serious security issue when the user is not aware of the existence of all attachments and content.

Therefore, there is a need for an improved system and method of forwarding e-mails from a wireless device where the e-mail has associated attachments.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In accordance with an aspect of the present disclosure there is provided a system for forwarding an e-mail message from a wireless device, the system comprising a server for receiving the e-mail message and forwarding the e-mail to one or more recipients; and a wireless device comprising a processor and a memory containing instructions for: receiving e-mail message portions of the e-mail message; determining an attachment indicator to identify attachments in received e-mail message portions to be forwarded with a body of the e-mail message to one or more recipients; sending a forwarding request from the wireless device to the server, the forwarding request comprising a message identifier, the attachment indicator and the identification of the one or more recipients; and wherein the server retrieves the e-mail message body using the e-mail identifier and extracts the attachments identified by the attachment indicator to forward to the one or more recipients.

In accordance with another aspect of the present disclosure there is provided a system for forwarding an e-mail message from a wireless device, the system comprising a server for receiving the e-mail message and forwarding the e-mail to one or more recipients; and a wireless device comprising a processor and a memory containing instructions for: receiving e-mail message portions of the e-mail message; determining an attachment indicator to identify attachments in received e-mail message portions to be forwarded with a body of the e-mail message to one or more recipients; sending a forwarding request from the wireless device to the server, the forwarding request comprising a message identifier, the attachment indicator and the identification of the one or more recipients; and wherein the server retrieves the e-mail message body using the e-mail identifier and extracts the attachments identified by the attachment indicator to forward to the one or more recipients.

In accordance with yet another aspect of the present disclosure there is provided a computer readable memory containing instructions which when executed by a processor perform: receiving at the wireless device e-mail message portions of the e-mail message; determining an attachment indicator to identify attachments in received e-mail message portions to be forwarded with a body of the e-mail message to one or more recipients; sending a forwarding request from the wireless device to a server, the forwarding request comprising a message identifier, the attachment indicator and the identification of the one or more recipients; and wherein the server retrieves the e-mail message body using the e-mail identifier and extracts the attachments identified by the attachment indicator to forward to the one or more recipients.

In accordance with still yet another aspect of the present disclosure there is provided a method at a server of forwarding an e-mail message from a wireless device, the method comprising receiving a request from the wireless device to forward the e-mail message to one or more recipients, the request including a message identifier; determining an attachment indicator from request identifying a number of attachments associated with the e-mail message to be forwarded; retrieving the e-mail message from a user mailbox associated with wireless device using the message identifier; extracting the attachments from the retrieved e-mail message containing M attachments based on the attachment indicator; and forwarding a body of the e-mail message and the extracted attachments to the one or more recipients.

Embodiments are described below, by way of example only, with reference to FIGS. 1-7.

When forwarding regular, or unencrypted e-mail messages with attachments from a wireless device, typically the device doesn't send the attachments from the original message being forwarded to the mail server or wireless server; instead, the server simply looks in the mailbox at the original message, and adds on all the attachments from the original message. If the user is forwarding an encrypted message for which they are not aware of the existence of all attachments, the user may inadvertently forward attachments, since the user's device did not receive all of the attachments. The user is therefore not aware that the original message being forwarded contained additional attachments and may inadvertently forward sensitive data unknowingly.

To conserve data resources on a wireless device, when forwarding or replying to a message, as an optimization, typically the contents of the original message are not sent from the wireless device to the wireless server or mail server; instead, the wireless device sends only the newly typed message body and a pointer (or reference ID) to the original message. In typical situations the server may forward the original message and inadvertently send all of the attachments even if the forwarding party was not aware of them. In the present disclosure, the system and method enable only attachments to be forwarded with a message for which the user is aware of their existence or has identified on their device for forwarding. For example, in a system where the wireless device only receives portions of an original message as requested from the server on an as needed basis, the user may not have the entire message and all of the attachments prior to forwarding the e-mail message. If it happens that the original encrypted message has three attachments, but the user never downloaded enough of the original message to see all three attachments, no attachments are included in the forwarded message so that the user does not unknowingly forward attachments to other parties that may contain sensitive information.

The standard representation of e-mail message is the Multipurpose Internet Mail Extensions (MIME) protocol which is an Internet standard that extends the format of e-mail. MIME supports text in character sets other than ASCII, non-text attachments, message bodies with multiple parts, and header information in non-ASCII character sets. S/MIME (Secure/Multipurpose Internet Mail Extensions) protocol is a standard for public key encryption and signing of MIME data. For encrypted S/MIME messages the wireless device sends down a key which allows the original message being forwarded to be decrypted by the wireless server, so that the wireless server can get at the attachment contents. Attachments are embedded within S/MIME body and are not visible until the portion of the e-mail message containing the respective attachment is downloaded to the wireless device. Attachments are received in a serial manner based upon their position within the body text of the e-mail message. The attachments may be any file type such as media files, documents, executable files, or compressed files that are supported for embedding in the MIME format.

Figure 1:
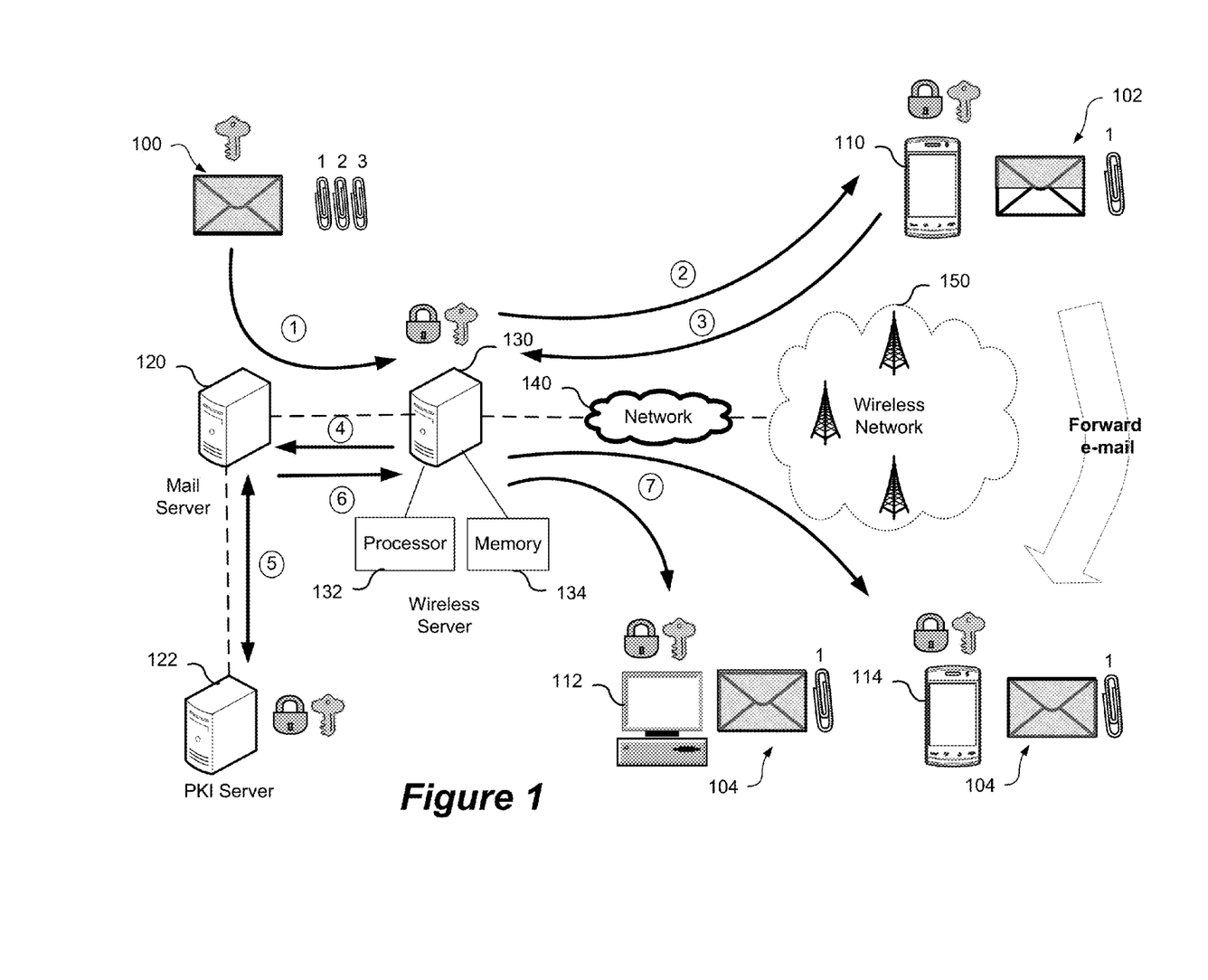
FIG. 1 shows a representation of e-mail message attachment forwarding from a wireless device.

FIG. 1 shows a representation of e-mail message attachment forwarding from a wireless device. An e-mail message 100 having three associated attachments is delivered to a mail server 120 (1) and is identified to a wireless server 130, comprising at least a processor 132 and a memory 134. The wireless server 130 determines the destination user and the associated wireless device 110 and forwards one or more portions (2) of the original e-mail message 100, as required or requested, to the wireless device 110 coupled to network 140, such as the Internet, and a wireless network 150. The received e-mail message 102 may therefore only contain portions of the original text (indicated as full/partial hatching of envelopes in FIG. 1) and only provide a subset of the original attachments (indicated as enumerated paperclips in FIG. 1). For example the portions of the original e-mail received by user 110 only contain the first attachment. The user then forwards the e-mail message (3) by sending a request to the wireless server 130. The request includes a message identifier and an attachment indicator to identify the amount of the original e-mail delivered or view on the wireless device and the number of attachments to be forwarded. The wireless server 130 can then retrieve the e-mail message from the user's mailbox on the mail server 120 (4). In this representation the wireless server 130 and mail server 120 are depicted as being separate entities however, they may be a single server and reside on the same device and/or be incorporated or integrated into the same application as required, however for simplicity the term wireless sever is used throughout the disclosure. The mail server 120 may also use or receive keys from a public key infrastructure (PKI) server 122 (5). The requested message is then provided to the wireless server 130 (6). The wireless server 130 then extracts the attachments based on the attachment indicator and generates an e-mail message with any additional text added by the user and portions of the original e-mail message text. The e-mail message is then forwarded to devices 112 and 114, the forwarded message 104 having only the attachments that were provided to wireless device 110. It should be noted that recipients of the e-mail message 104 may not necessarily be coupled to the wireless network 150 but can be any device capable of receiving an e-mail message.

Figure 2:
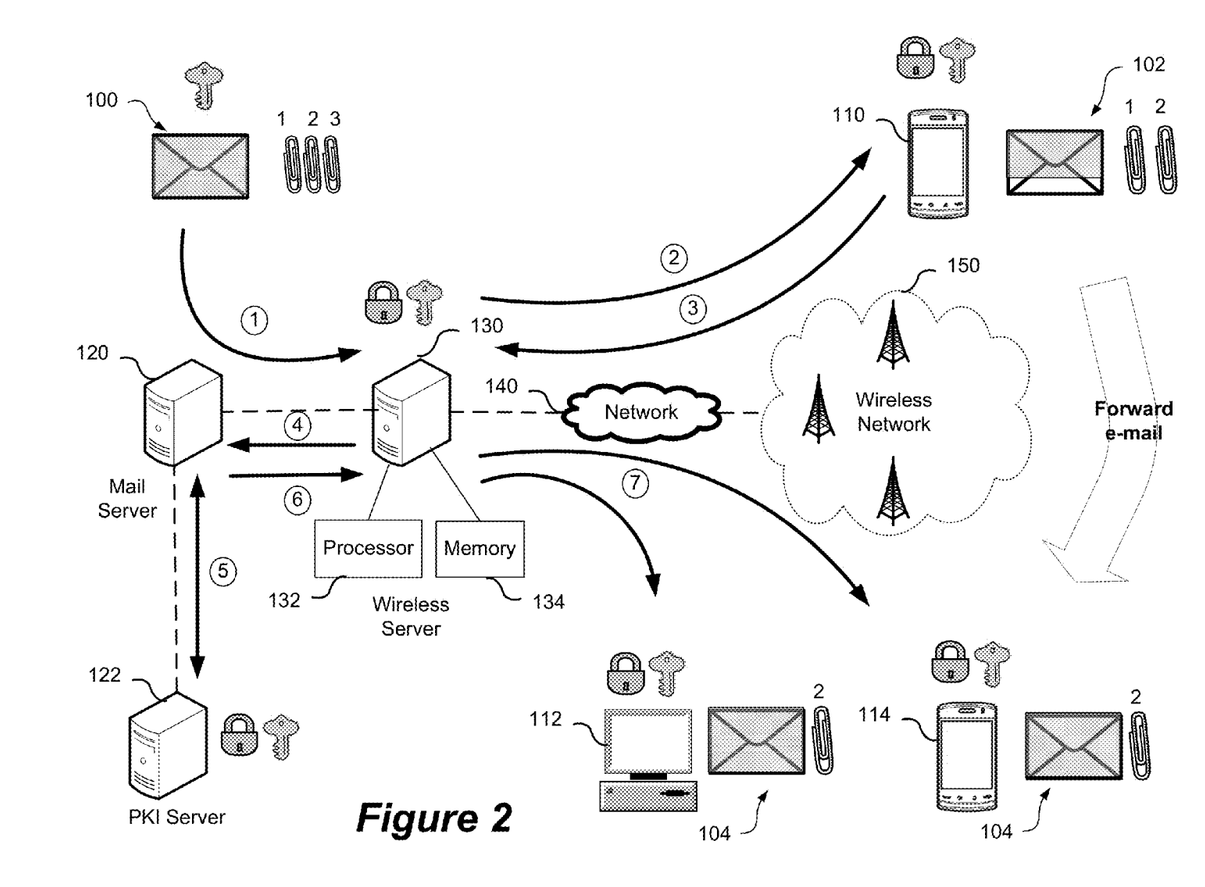
FIG. 2 shows a representation of e-mail message attachment forwarding from a wireless device where a subset of delivered attachments are forwarded.

FIG. 2 shows a representation of e-mail message attachment forwarding from a wireless device where a subset of delivered attachments are forwarded. In this example portions of the original e-mail message are delivered to the wireless device 110 containing two out of three e-mail attachments (shown as enumerated paperclips in FIG. 2). Based upon user selection and/or viewing metrics, a subset of received attachments are selected for forwarding. The attachments are identified by the attachment indicator, which in this example may uniquely identify the attachment by name, position within the e-mail or associated portion. The e-mail message 104 forwarded to devices 112 and 114 would therefore only have the selected attachment provided. In this example, only attachment #2 is forwarded to the devices who are therefore not aware of attachments #1 and #3.

Figure 3:
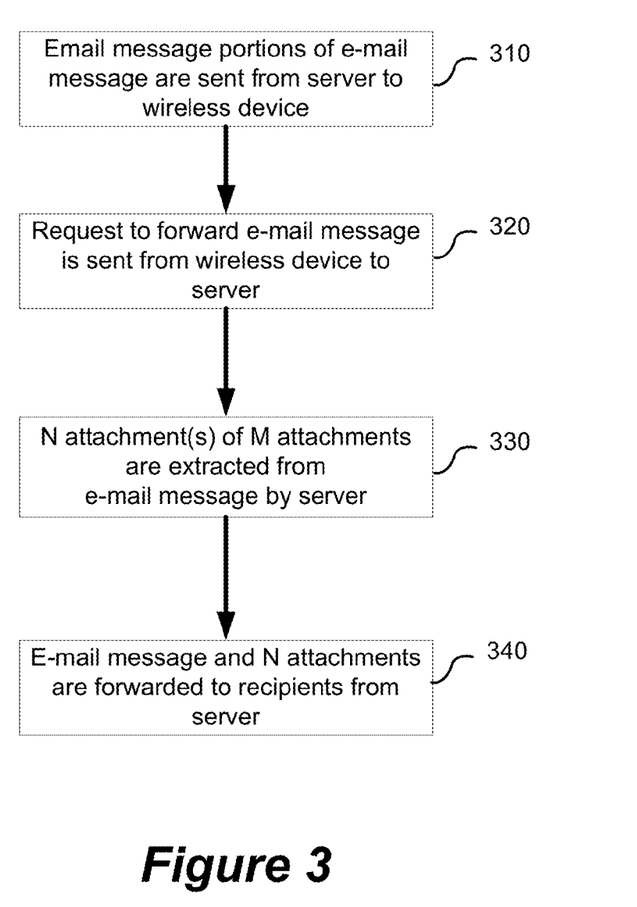
FIG. 3 shows a method of e-mail message attachment forwarding from a wireless device and a wireless server.

FIG. 3 shows a method of e-mail message attachment forwarding from a wireless device and a wireless server. One or more portions of the e-mail message are sent from the wireless server to the wireless device (310). The original e-mail message has M attachments associated with it, while the portions sent to the wireless device only contain N attachments, as all of the portions associated with the message are not received by the device prior to a forwarding request. A request to forward the e-mail message is sent from the wireless device to the wireless server (320) and/or wireless server. The request identifies the attachments present in the portion (s) of the e-mail message that were received at the device by an attachment count N. In addition, the request provides the forwarding information such as identification of the recipients and text to be provided in the forwarding e-mail message in a standard messaging format such as provided by the MIME protocol. An e-mail message identifier may also be provided that identifies the original message in the user e-mail box than can be retrieved by the wireless sever. For example, in the portions of the e-mail message received at the wireless device only two out of three attachments were present. N attachments, of a total of M attachments present in the original e-mail message are extracted from the e-mail message by the wireless server (330). The process of extracting the e-mail message attachments may require retrieving or receiving an encryption key from the wireless device or public key infrastructure (PKI) server to extract the attachments. The e-mail message and the N attachments are then forwarded to the recipients from the wireless server (340) along with the forwarded e-mail message. By only forwarding attachments identified as being provided to the wireless device, a user does not inadvertently forward un-viewed attachments. The user of the wireless device may also be presented with an option, if they are examining an encrypted message, to request that the wireless server decrypt the original message and send the attachment headers to the device. The user can then be aware of all the attachments and decide which attachments are to be forwarded. In this case, the device is required to send a decryption key to the wireless server, or mail server, to enable decryption of the original message. Only attachments that are identified by the forwarding device are forwarded to recipient ensuring that attachments that a user is unaware of are not inappropriately distributed.

Figure 4:
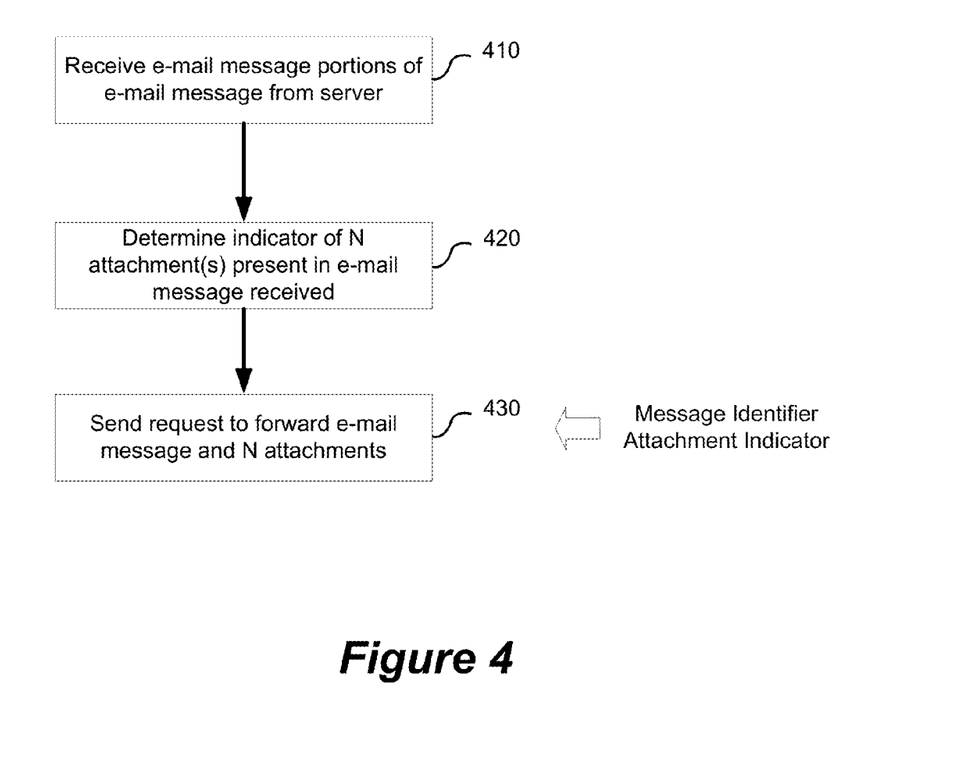
FIG. 4 shows a method of e-mail message attachment forwarding performed at a wireless device.

FIG. 4 shows a method of e-mail message attachment forwarding performed at a wireless device. One or more portions of the e-mail message are received at the wireless device from a wireless server (410) and/or mail server. The portions are provided incrementally as the message is viewed by the user on the wireless device. A request initiated by the user to forward the e-mail containing the N attachments is received. The user may, or may not have viewed the N attachments that are present in the e-mail message portions are received at the wireless device where the message has M original attachments. If the message is provided in an encrypted protocol format such as S/MIME, or marked as secure or confidential either through metadata associated with the email, or by some other identifier such as subject line, body text, etc. identification an attachment indicator is then determined identifying N attachments as being present in the e-mail message (420) that was received and are to be forwarded. The forwarding request is then sent to the wireless server (430) providing the forwarding text provided by the user, a message identifier to allow retrieval of the original message from an associated user mailbox and an attachment indicator so that the server may extract the first N attachments present in the e-mail message. The method may also comprise appending to the body of the email text identifying that the e-mail message was truncated or that additional attachments were not forwarded from the original message.

Figure 5:
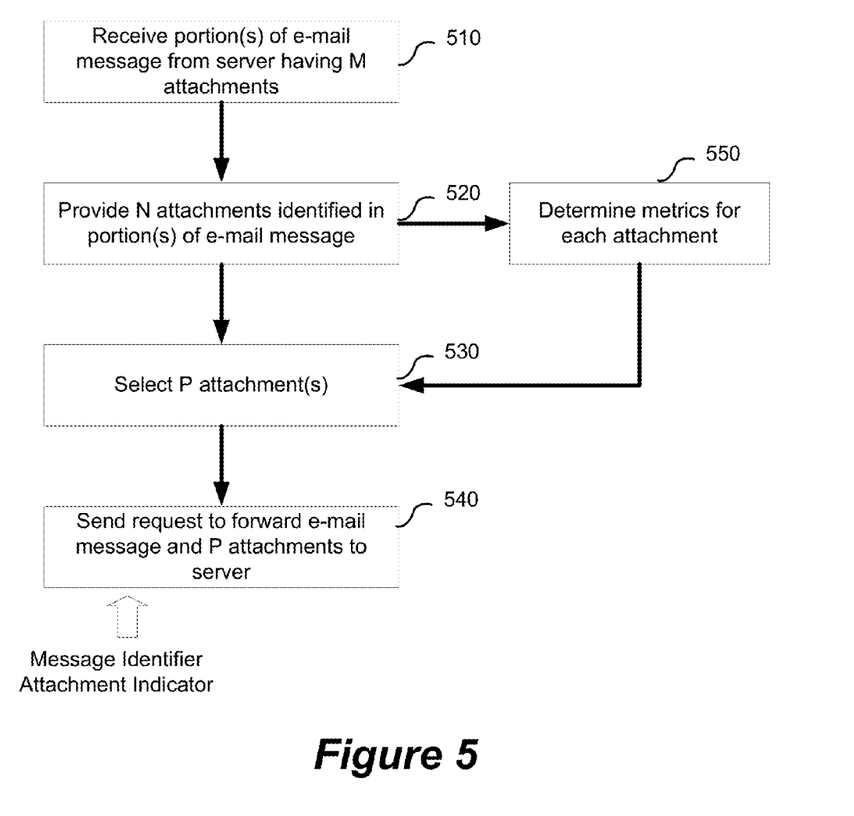
FIG. 5 shows a method of selective e-mail message attachment forwarding performed at a wireless device.

FIG. 5 shows a method of selective e-mail message attachment forwarding from a wireless device. The wireless devices receives one or more portions of the e-mail message (510) containing N attachments. The original e-mail message containing M attachments, are only provided to the wireless device as portions of the email are delivered based upon request from the device, mail application or as network conditions or configuration allow. If the message is provided in an encrypted protocol format such as S/MIME, or marked as confidential either through metadata associated with the email, or by some other identifier such as subject line, body text, etc. identification the N attachments identified in the portions received e-mail message are provided to the device and can be accessed by the user (520). Of the displayed attachments, P attachments are indicated as being viewed by the user (530). The user can then select particular attachments to be forwarded. A request to forward the e-mail message and P attachments is then sent to the wireless server (540). Alternatively, when the user is selecting the P attachments to forward at (530), metrics may be determined for each attachment (550). For example, these metrics can include whether the attachment was viewed, how long the attachment was viewed for (in time such as seconds) or whether each page of the attachment was examined (X of Y pages) The device can also provide an option to the user to declare how high in each of these metrics an attachment must be measured in order to be considered viewed. This option may be presented on a per e-mail basis or defined as an option in the e-mail application itself and applied to all forwarding situations to enable automatic attachment selection. The device can also prompt the user with a warning indicating which attachments haven't been viewed, presenting the user with relevant metrics (e.g. 'You spent 53 seconds examining this attachment', or 'You read the first 5 of 10 pages of this attachment'). The device can present a user with dialog indicating relevant statuses of each attachment, along with a selection box such as a checkbox indicating which attachments will be included based on whether the user has actually seen the attachment. The user can then toggle which P of N attachments to forward with the message body and forwarding text. The user can then make an individual assessment as to the P attachments that are to be forwarded, based upon the N attachments received at the wireless device. The forwarded message will therefore only contain P attachments present on the wireless device and will not forwarded any of N attachments not specifically identified by the user or the M attachments associated with the original e-mail message but not actually delivered to the device.

Figure 6:
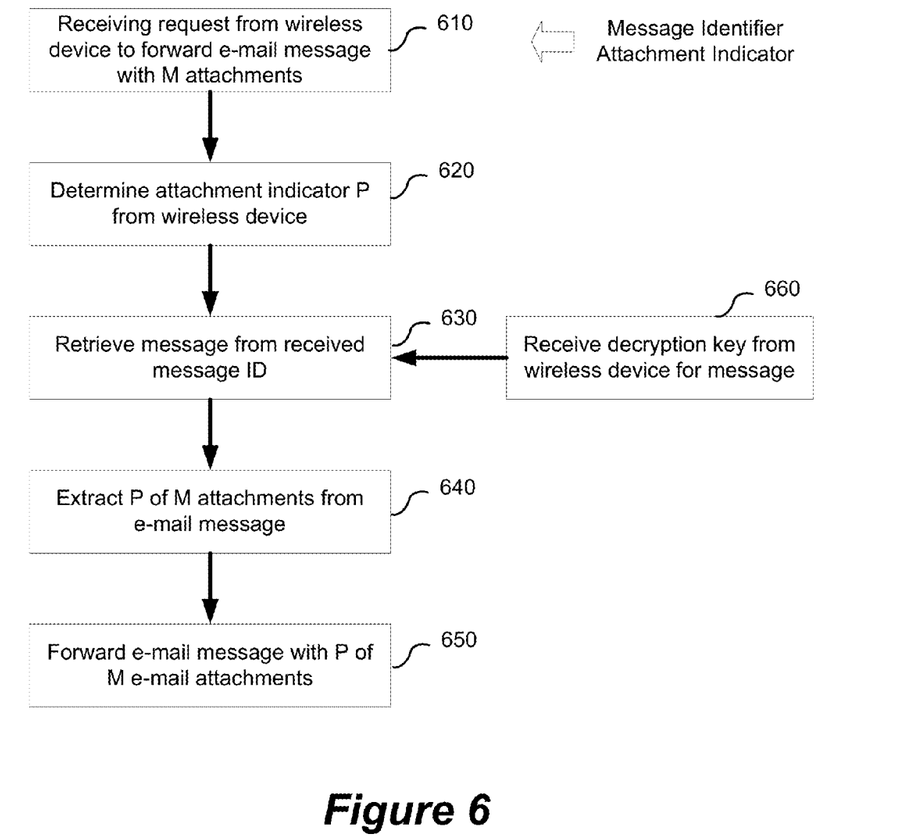
FIG. 6 shows a method at a wireless server of e-mail forwarding from a wireless device.

FIG. 6 shows a method at a wireless server for implementing e-mail forwarding from a wireless device. A request from the wireless device to forward an e-mail message containing M e-mail message attachments is received at the wireless server (610), and/or mail server. The attachment indicator P, or N depending on device software configuration, is determined from the forwarding request (620) received from the device. The message associated with a received message identifier is retrieved (630) from a mailbox location associated with the user. If the message is an encrypted message, the wireless device will also provide decryption keys of the message (660) so that the wireless server can decrypt the message and extract the appropriate attachments. The indicated attachments are then extracted from the original e-mail message (640) by the server. The attachment indicator may be a value identifying that the first N attachments were received and are to be forwarded, or in the case of selective forwarding the indicator P may be a unique identifier associated with each attachment (attachments abc.doc and fgh.doc), or define the relative position of the attachment within the portions of the e-mail (attachments 1, 3, and 5), or the portions that were received at the device where the associated attachment starts (portion 6, portion 9). Only the identified attachments P are selectively forwarded where the device received N attachments. The forwarded e-mail is then sent to the identified recipients in the forwarding request (650), where the forwarded e-mail only contains P (or N) of M attachments viewed or selected by the user of the device. The message identifier and attachment indicator can be incorporated in the MIME encoding of the e-mail message.

Figure 7:
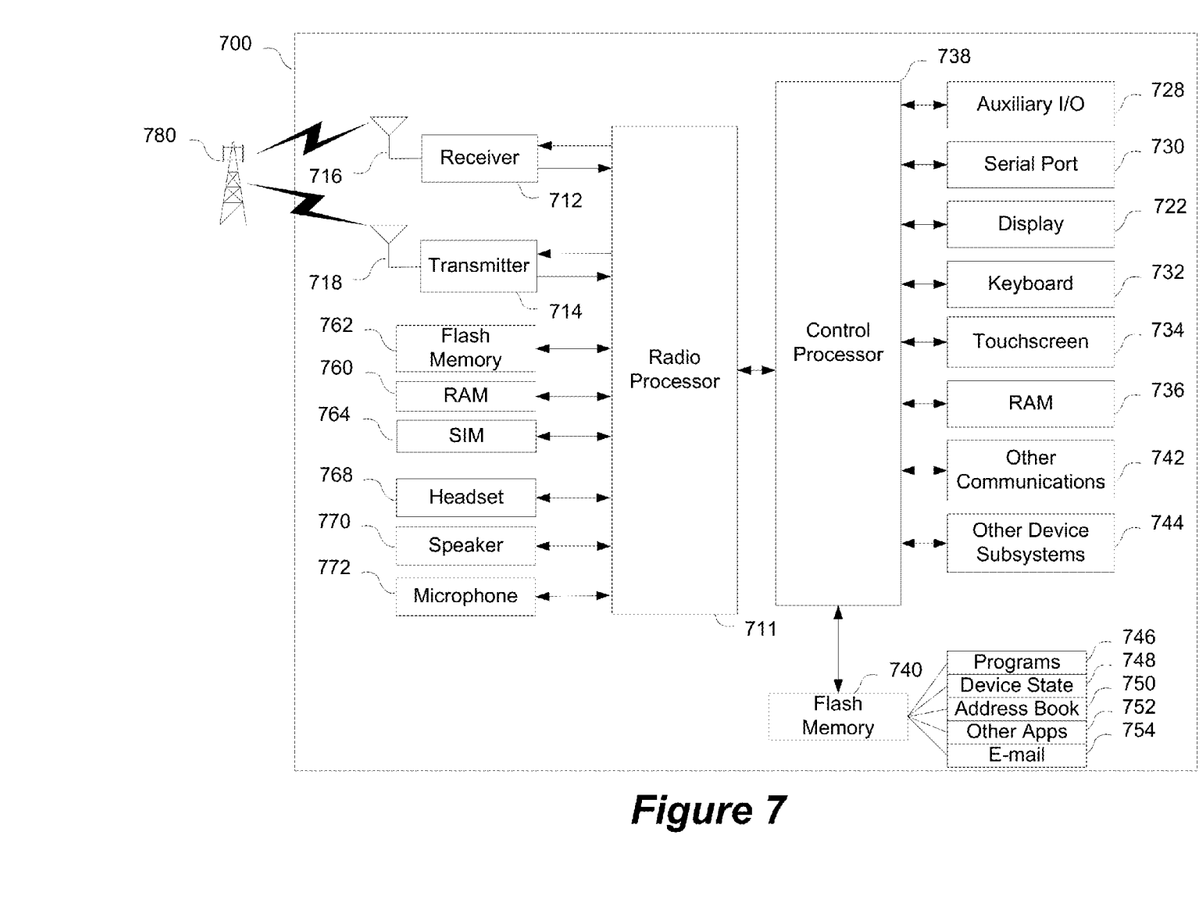
FIG. 7 shows a representation of a wireless device.

FIG. 7 is a block diagram of a wireless device for replying/forwarding of e-mail, in particular a wireless device 700 is shown incorporating a communication subsystem having both a receiver 712 and a transmitter 714 as well as associated components such as one or more embedded or internal antenna elements 716 and 718. The particular design of the communication subsystem will be dependent upon the communication network in which the device is intended to operate.

When required network registration or activation procedures have been completed, wireless device 700 may send and receive communication signals over a wireless network 780. Signals received by antenna 716 are input to receiver 712, which may perform such common receiver functions as signal amplification, frequency down conversion, channel selection and the like. Radio processor 711 interacts with receiver 712 and transmitter 714, and further with flash memory 762, random access memory (RAM) 760, the subscriber identity module 764, a headset 768, a speaker 770, and a microphone 772.

Microprocessor 738 interacts with further device subsystems such as the display 722, flash memory 740, random access memory (RAM) 736, auxiliary input/output (I/O) subsystems 728, serial port 730, keyboard 732, input devices such as a touch screen or touch input device 734, other communications 742 and other device subsystems generally designated as 744.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list. Additionally certain components may be combined, for example, the keyboard 732 and the display 722 may be combined as a single component such as a touch screen.

Software used by radio processor 711 and microprocessor 738 is stored in a persistent store such as flash memory 740 and 762, which may instead be a read-only memory (ROM) or similar storage element (not shown). Those skilled in the art will appreciate that the operating system, specific device applications, or parts thereof, may be temporarily loaded into a volatile memory such as RAM 736 and RAM 760. Received communication signals may also be stored in RAM 736.

As shown, flash memory 740 can be segregated into different areas for computer programs 746, device state 748, address book 750, other applications 752 and e-mail programs 754. These different storage types indicate that each program can allocate a portion of flash memory 740 for their own data storage requirements. Microprocessor 738, in addition to its operating system functions, preferably enables execution of software applications on the wireless device For voice communications, overall operation of wireless device 700 is similar, except that received signals would preferably be output to the speaker 770 or headset 768 and signals for transmission would be generated by the microphone 772. Alternative voice or audio I/O subsystems, such as a voice message recording subsystem, may also be implemented on wireless device 700.

Other device subsystems 744, such as a short-range communications subsystem, is a further optional component which may provide for communication between wireless device 700 and different systems or devices, which need not necessarily be similar devices. For example, the subsystem 744 may include an infrared device and associated circuits and components or a Bluetooth™ communication module to provide for communication with similarly enabled systems and devices.

The system and methods according to the present disclosure may be implemented by any hardware, software or a combination of hardware and software having the above described functions. The software code, either in its entirety or a part thereof, may be stored in a computer-readable memory. Further, a computer data program representing the software code may be embodied on a computer-readable memory.

While a particular embodiment of the present system and methods for forwarding e-mail message attachments from a wireless device have been described herein, it will be appreciated by those skilled in the art that changes and modifications may be made thereto without departing from the disclosure in its broadest aspects and as set forth in the following claims.

The invention claimed is:

1. A method of forwarding an e-mail message from a wireless device the method comprising:
   receiving at the wireless device e-mail message portions of the e-mail message the e-mail message comprising one or more attachments;
   determining an attachment indicator, identifying attachments; from the one or more attachments, that have been received at, or displayed on, the wireless device to be forwarded with a body of the e-mail message to one or more recipients;
   sending a forwarding request from the wireless device to a server, the forwarding request comprising a message identifier, the attachment indicator and an identification of the one or more recipients;
   wherein the forwarding request causes the server to retrieve an e-mail message body using the e-mail identifier and extracts attachments identified by the attachment indicator to forward to the one or more recipients.

2. The method of claim 1 wherein the e-mail message portions received at the wireless device contain N attachments of M attachments associated with the e-mail message.

3. The method of claim 2 wherein the attachment indicator identifies the N attachments received at the wireless device in the e-mail message portions.

4. The method of claim 3 wherein the attachment indictor identifies a subset P attachments of the N attachments that have been displayed by the wireless device to be forwarded with the e-mail message.

5. The method of claim 4 wherein each of the subset P attachments has a unique identifier for each attachment to be extracted from the original e-mail.

6. The method of claim 5 wherein the attachment indicator uniquely identifies the subset of P attachments determined by viewing metrics, indicative of, if an attachment has been viewed associated with the N attachments.

7. The method of claim 6 wherein the attachment indicator uniquely identifies the subset of P attachments identified by user selection from the N attachments received at the wireless device and to be forwarded with the e-mail message.

8. The method of claim 7 wherein further comprising presenting viewing metrics indicative of if an attachment has been viewed for each of N attachments prior to selection of subset of P attachments for forwarding.

9. The method of claim 1 wherein the e-mail message is an encrypted e-mail message.

10. The method of claim 9 wherein the encrypted e-mail message is a Secure/Multipurpose Internet Mail Extensions (S/MIME) format message.

11. The method of claim 10 wherein sending the forwarding request further includes sending a decryption key to the server for decrypting the e-mail message and extracting the attachments associated with the attachment indicator.

12. A system for forwarding an e-mail message from a wireless device, the system comprising:
a server for receiving the e-mail message and forwarding the e-mail to one or more recipients; and
a wireless device comprising a processor and a memory containing instructions for:
receiving e-mail message portions of the e-mail message, the e-mail message comprising one or more attachments;
determining an attachment indicator, identifying attachments in, from the one or more attachments, that have been received at, or displayed on, the wireless device to be forwarded with a body of the e-mail message to one or more recipients;
sending a forwarding request from the wireless device to the server, the forwarding request comprising a message identifier, the attachment indicator and an identification of the one or more recipients;
wherein the forwarding request causes the server to retrieve an e-mail message body using the message identifier and extracts attachments identified by the attachment indicator to forward to the one or more recipients.

13. The system of claim 12 wherein the e-mail message portions received at the wireless device contain N attachments of M attachments associated with the e-mail message.

14. The system of claim 13 wherein the attachment indicator identifies the N attachments received at the device in the e-mail message portions.

15. The system of claim 14 wherein the attachment indictor identifies a subset P attachments of the N attachments that have been displayed by the wireless device to be forwarded with the e-mail message.

16. The system of claim 15 wherein each of the subset P attachments has a unique identifier for each attachment to be extracted from the original e-mail.

17. The system of claim 16 wherein the attachment indicator uniquely identifies the subset of P attachments determined by viewing metrics indicative of, if an attachment has been viewed associated with the N attachments.

18. The system of claim 17 wherein the attachment indicator uniquely identifies the subset of P attachments identified by user selection from the N attachments received at the wireless device and to be forwarded with the e-mail message.

19. The system of claim 18 wherein further comprising presenting viewing metrics indicative of, if an attachment has been viewed for each of N attachments prior to selection of subset of P attachments for forwarding.

20. The system of claim 12 wherein the e-mail message is an encrypted e-mail message.

21. The system of claim 20 wherein the encrypted e-mail message is a Secure/Multipurpose Internet Mail Extensions (S/MIME) format message.

22. The system of claim 21 wherein the server uses a decryption key to decrypt the e-mail message and extract the attachments associated with the attachment indicator.

23. A computer readable memory containing instructions which when executed by a processor perform:
receiving at the wireless device e-mail message portions of the e-mail message, the e-mail message comprising one or more attachments;
determining an attachment indicator, identifying attachments, from the one or more attachments, that have been received at, or displayed on, the wireless device in to be forwarded with a body of the e-mail message to one or more recipients;
sending a forwarding request from the wireless device to a server, the forwarding request comprising a message identifier, the attachment indicator and an identification of the one or more recipients;
wherein the forwarding request causes the server to retrieve an e-mail message body using the message identifier and extracts attachments identified by the attachment indicator to forward to the one or more recipients.

* * * * *